(12) United States Patent
Obermoser et al.

(10) Patent No.: US 11,851,182 B2
(45) Date of Patent: Dec. 26, 2023

(54) AIRCRAFT AND METHOD FOR OPERATING AN AIRCRAFT

(71) Applicant: KMTC Vortifer Projektgesellschaft mbH, Fellbach (DE)

(72) Inventors: Karl Obermoser, Deining (DE); Claudia Meier, Deining (DE)

(73) Assignee: KMTC Vortifer Projektgesellschaft mbH, Fellbach (DE)

( * ) Notice: Subject to any disclaimer, the term of this patent is extended or adjusted under 35 U.S.C. 154(b) by 137 days.

(21) Appl. No.: 17/426,835

(22) PCT Filed: Jan. 28, 2020

(86) PCT No.: PCT/EP2020/052021
§ 371 (c)(1),
(2) Date: Jul. 29, 2021

(87) PCT Pub. No.: WO2020/157052
PCT Pub. Date: Aug. 6, 2020

(65) Prior Publication Data
US 2022/0119112 A1    Apr. 21, 2022

(30) Foreign Application Priority Data

Jan. 30, 2019  (DE) .................... 10 2019 000 682.8
Jul. 15, 2019  (DE) .................... 10 2019 210 417.7

(51) Int. Cl.
*B64C 39/06* (2006.01)
*B64C 39/02* (2023.01)
(Continued)

(52) U.S. Cl.
CPC .......... *B64C 39/064* (2013.01); *B64C 39/024* (2013.01); *B64U 10/13* (2023.01); *B64U 30/20* (2023.01)

(58) Field of Classification Search
CPC ..... B64C 39/001; B64C 39/06; B64C 39/062; B64C 39/064
See application file for complete search history.

(56) References Cited

U.S. PATENT DOCUMENTS 2,468,787 A * 5/1949 Sharpe .................. B64C 39/064
                                             244/45 R
2,997,254 A   8/1961 Mulgrave et al.
(Continued)

FOREIGN PATENT DOCUMENTS

DE   2031281 A   1/1971
EP   3398852 A1  11/2018
(Continued)

OTHER PUBLICATIONS

International Search Report and Written Opinion for PCT/EP2020/052021 dated May 15, 2020, 17 pages.
(Continued)

*Primary Examiner* — Richard G Davis
(74) *Attorney, Agent, or Firm* — Sheppard Mullin Richter & Hampton LLP

(57) ABSTRACT

The invention relates to an aircraft (1). Said aircraft (1) is characterized by a wing (2) which, viewed in section, is delimited on one side by a first profiled surface (4), which is at the bottom when the aircraft (1) is operated as intended, and on the other side by an upper second profiled surface (5), which merges at an aerofoil transition point (6) with the first profiled surface (4), wherein the first profiled surface (4) surrounds at least one air inlet opening (7), and the second profiled surface (5) surrounds at least one air outlet opening (8), and the aircraft (1) comprises a drive apparatus (12) with an air delivery apparatus (1), which is provided and designed for sucking air through the at least one air inlet opening (7) and for discharging the intake air through the at least one air outlet opening (8), wherein the at least one air outlet opening
(Continued)

Figure 1:
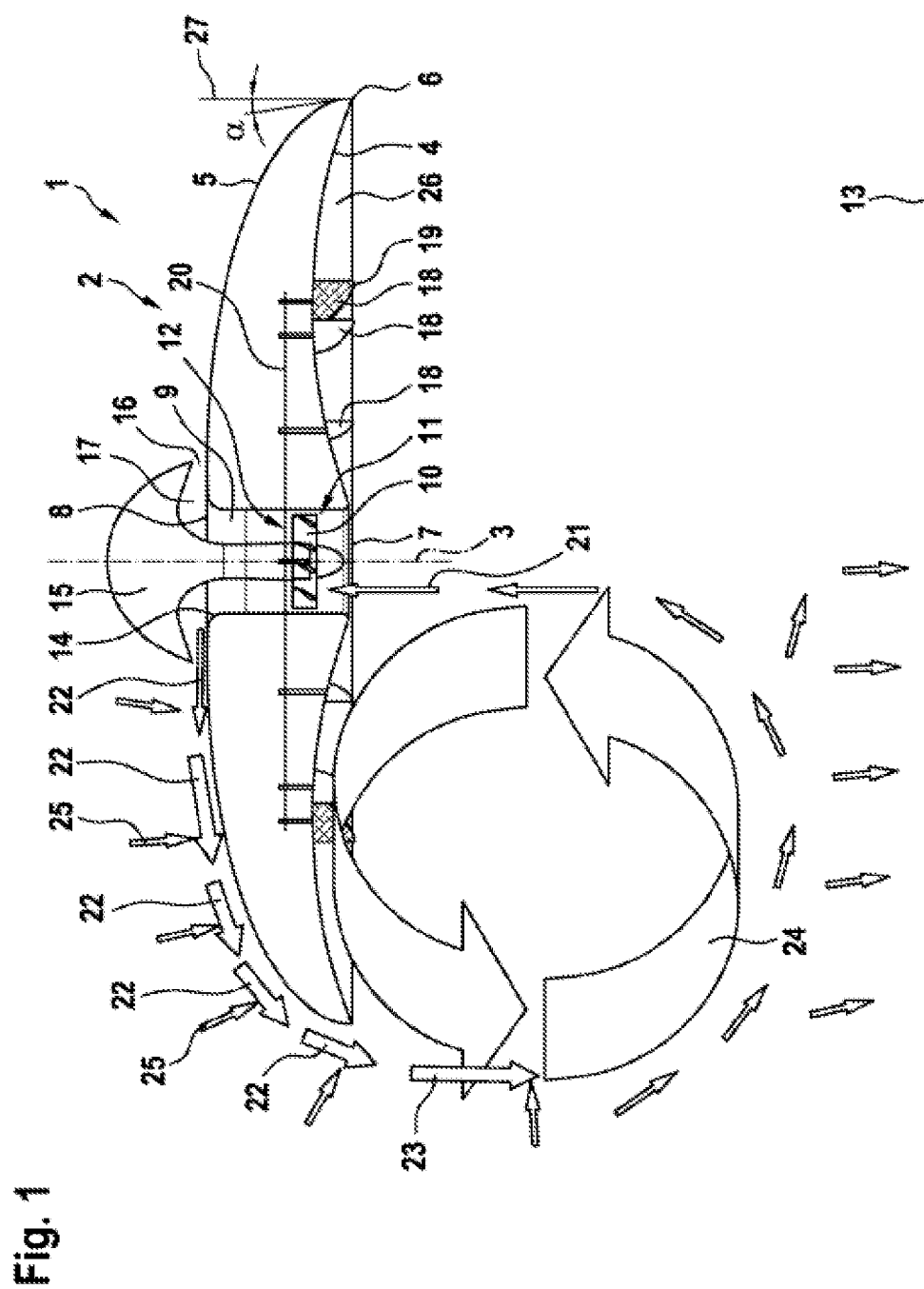

(8) is overlapped at least in part by a deflecting element (15) which, together with the second profiled surface (5), delimits an air outlet gap (16) which is flow-connected to the air outlet opening (8). The invention also relates to a method for operating an aircraft (1).

15 Claims, 3 Drawing Sheets

(51) Int. Cl.
  *B64U 10/13* (2023.01)
  *B64U 30/20* (2023.01)

(56) References Cited

U.S. PATENT DOCUMENTS

| | | | |
|---|---|---|---|
| 3,215,218 A * | 11/1965 | Hurst | B62D 57/04 |
| | | | 180/164 |
| 3,397,853 A * | 8/1968 | Richardson, Sr. | B64C 39/064 |
| | | | 244/220 |
| 3,592,413 A | 7/1971 | Thompson | |
| 3,747,726 A | 7/1973 | Walter | |
| 4,674,708 A | 6/1987 | del Castillo | |
| 5,203,521 A * | 4/1993 | Day | B64C 39/064 |
| | | | D12/325 |
| 7,147,183 B1 | 12/2006 | Carr et al. | |
| 9,162,764 B2 * | 10/2015 | Babinsky | B64C 39/064 |
| 9,802,700 B1 | 10/2017 | Essary | |
| 2004/0164203 A1 | 8/2004 | Billiu | |
| 2009/0242689 A1 | 10/2009 | Hatton et al. | |
| 2012/0068021 A1 | 3/2012 | Babinsky et al. | |

FOREIGN PATENT DOCUMENTS

| | | |
|---|---|---|
| GB | 915515 A | 1/1963 |
| GB | 2387158 A | 10/2003 |
| GB | 2424406 A | 9/2006 |
| GB | 2452255 A | 3/2009 |
| GB | 2471663 A | 1/2011 |
| GB | 2472023 A | 1/2011 |
| JP | 200929400 A | 8/2010 |
| WO | 9013478 A1 | 11/1990 |
| WO | 2009068835 A1 | 6/2009 |

OTHER PUBLICATIONS

Japanese Office Action dated Sep. 12, 2023 for JP Application No. 2021-544736. 14 pages. (In Japanese with English translation).

* cited by examiner

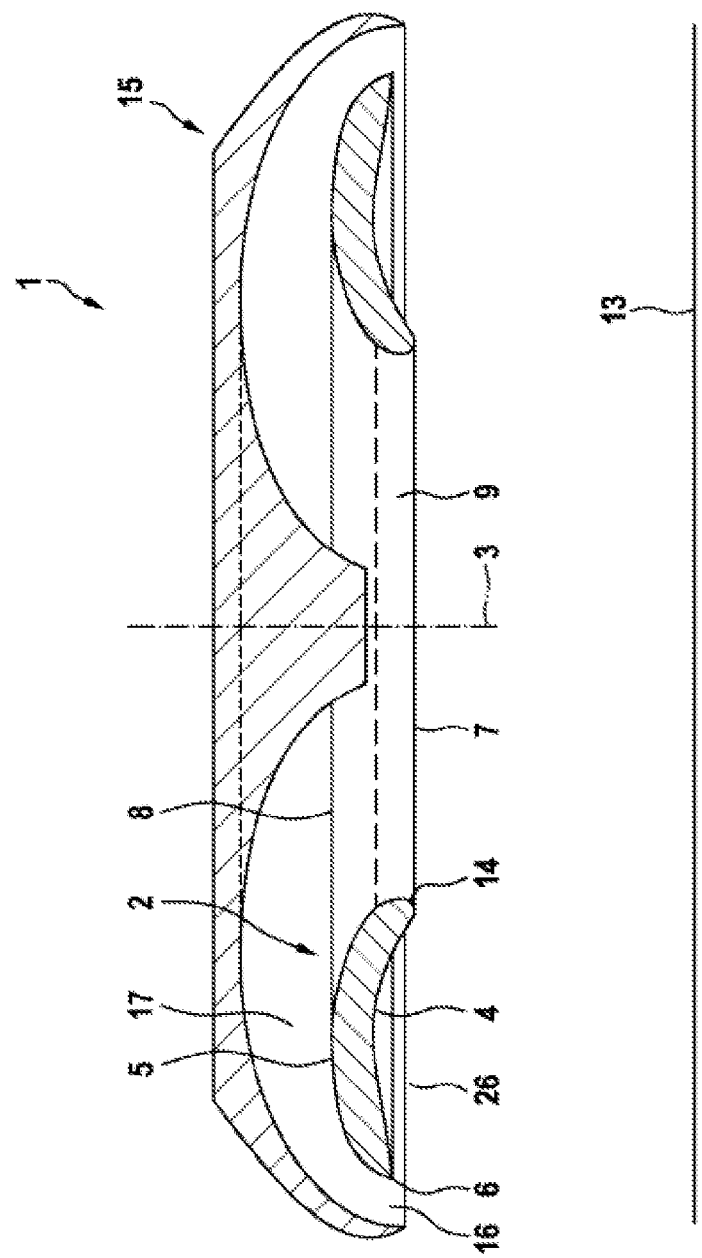

AIRCRAFT AND METHOD FOR OPERATING AN AIRCRAFT

CROSS REFERENCE TO RELATED APPLICATIONS

This application is a U.S. National Stage Application under 35 U.S.C. 371 of International Application No. PCT/EP2020/052021, filed Jan. 28, 2020, which application claims priority to German Patent Application Nos. 10 2019 000 682.8, filed Jan. 30, 2019 and 10 2019 210 417.7, filed Jul. 15, 2019. The content of each is hereby incorporated by reference in its entirety into the present disclosure.

The invention relates to an aircraft and a method for operating an aircraft.

The publication DE 20 2018 104 722 U1, for example, is known from the prior art. Said publication describes an aircraft with a frame structure and several lifting rotors arranged on the frame structure, by means of which a vertically upwardly directed primary lift and propulsion forces can be generated. It is provided that a jet turbine is also provided, the thrust jet of which can be directed such that a secondary lift directed substantially parallel to the primary lift can be generated, which can be superimposed on the primary lift.

It is the object of the invention to propose an aircraft which has advantages over known aircraft, can be scaled as desired, in particular with regard to its payload, and also enables particularly efficient operation.

This is achieved according to the invention with an aircraft having the features of claim 1. Said aircraft is characterized by a wing which, viewed in section, is delimited on one side by a lower first profiled surface when the aircraft is operated as intended and on the other side by an upper second profiled surface, which merges at an aerofoil transition point with the first profiled surface, wherein the first profiled surface surrounds at least one air inlet opening and the second profiled surface surrounds at least one air outlet opening, and the aircraft comprises a drive apparatus with an air delivery apparatus, which is provided and designed for sucking air through the at least one air inlet opening and for discharging the intake air through the at least one air outlet opening, wherein the at least one air outlet opening is overlapped at least in part by a deflection element which, together with the second profiled surface, delimits an air outlet gap which is flow-connected to the air outlet opening.

In principle, the aircraft can be designed as desired, for example it is in the form of an unmanned aerial vehicle or, preferably, an aircraft. An aircraft is to be understood as a vehicle that flies within the earth's atmosphere. To this extent, it represents a mobile means of transport that is used to transport people, goods or the like. The aircraft is therefore intended and designed for passenger traffic and/or freight traffic. The aircraft is heavier than air and has a drive apparatus or a power drive, so that the aircraft can be referred to as an aircraft as a whole. In very general terms, an aircraft is heavier than air and generates the dynamic lift required for its flight with non-rotating lift surfaces.

The aircraft according to the invention has a wing, wherein it is understood that a plurality of wings can also be used, which are preferably connected to one another, in particular via a structure of the aircraft. In the latter case, the following statements apply to the wing, preferably for a plurality of the wings or for each of the wings. When viewed in section, the wing is delimited by two profiled surfaces, namely by the first profiled surface and the second profiled surface. The first profiled surface and the second profiled surface delimit the wing in opposite directions, in particular with respect to a longitudinal center axis of the wing or the aircraft. When the aircraft is operated as intended, the first profiled surface is arranged at the bottom and the second profile surface is arranged above, so the first profiled surface is on the side of the aircraft facing a ground, whereas the second profiled surface is arranged on a side of the aircraft facing away from the ground.

Viewed in section, the first profiled surface and the second profiled surface converge at the aerofoil transition point and therefore merge into one another at the aerofoil transition point. The aerofoil transition point is, for example, a line, in particular a line with a continuous course and/or a continuous line, or runs continuously along the line. The continuous line means that the line is self-contained, that is, a starting point of the line corresponds to an end point of the line and the starting point and the end point are continuously connected to one another. For example, the line can be a straight line. However, it is preferably round or circular or oval. The aerofoil transition points can correspond to a wing outer side or be present on this. The outer side of the wing represents the point of the wing furthest from the longitudinal center axis or is located at this point. For example, the wing transition point is a wing transition edge, at which the first profiled surface and the second profiled surface, viewed in section, abut one another discontinuously and merge into one another.

While the first profiled surface and the second profiled surface converge at the aerofoil transition point, they can be spaced apart from one another at a wing inner side opposite the aerofoil transition point in section, in particular they are spaced apart from one another on the wing inner side. The first profiled surface and the second profiled surface run away from each other, for example viewed in section, starting from the aerofoil transition point in the direction of the wing inner side, so that they are at a greater distance from one another on the wing inner side than at the aerofoil transition point. In this respect, the aerofoil transition point is in any case further outside than the wing inner side, viewed in section, in particular it is further spaced from the longitudinal center axis. It is particularly preferably provided that the distance between the first profiled surface and the second profiled surface increases continuously starting from the aerofoil transition point in the direction of the wing inner side. For this purpose, the two profiled surfaces are designed and/or arranged accordingly. However, it can also be provided that the first profiled surface and the second profiled surface continuously merge into one another on the inside of the wing. With such a configuration of the wing, a particularly low-turbulence and thus loss-free inflow of air through the air inlet opening can be achieved.

The aircraft has an air inlet opening and an air outlet opening. During operation of the aircraft, air is sucked through the air inlet opening and discharged through the air outlet opening. For this purpose, the air inlet opening and the air outlet opening are flow-connected to one another, so that the air sucked through the air inlet opening is subsequently discharged through the air outlet opening. It can be provided that there is only a single air inlet opening. Alternatively, a plurality of air inlet openings are implemented. This applies accordingly to the air outlet opening, so that there is either a single air outlet opening or a plurality of air outlet openings. If the air inlet opening is mentioned in the context of this description, the corresponding statements always apply to the at least one air inlet opening and vice versa and—in the case of several air inlet openings—to each of the air inlet openings. Analogously, the statements for the air outlet openings always apply to the at least one air outlet opening and vice versa and—in the case of several air outlet openings—for each of the several air outlet openings. In this sense, the formulations air inlet opening and at least one air inlet opening on the one hand and air outlet opening and at least one air outlet opening on the other hand are each provided with the same meaning.

The air inlet opening is framed by the first profiled surface and the air outlet opening by the second profiled surface. This is to be understood as meaning in particular that the air inlet opening is delimited by the side of the first profiled surface on the inside of the wing and the air outlet opening is delimited by the side of the second profiled surface on the inside of the wing. In particular, the first profiled surface surrounds the air inlet opening and the second profiled surface surrounds the air outlet opening in each case in an annular manner. However, it can also be provided that the air inlet opening extends through the first profile surface and/or the air outlet opening extends through the second profiled surface.

The aircraft has a drive device, which in turn has the air delivery device. This is provided and designed to convey air from the inlet opening in the direction of the air outlet opening when the aircraft is operated as intended and to that extent for sucking air through the air inlet opening and discharging it through the air outlet opening. The aircraft is now arranged geodetically in such a way that the first profiled surface is arranged below and the second profiled surface is arranged above when the aircraft is operated as intended. In other words, the first profiled surface faces the ground, whereas the second profiled surface faces away from the ground. This means that the drive apparatus conveys air from the underside of the aircraft to its upper side. The drive apparatus is provided and designed to convey air from a first side of the wing, which is the underside, on the side of the first profiled surface, to a second side of the wing, which is the upper side, on the side of the second profiled surface.

In order to nevertheless generate lift and enable flight operations, the deflecting element overlaps the air outlet opening at least in part. The deflecting element serves to deflect the air exiting through the air outlet opening and for this purpose, together with the second profiled surface, delimits the air outlet gap which is flow-connected with the air outlet opening. Since the deflecting element delimits the air outlet gap together with the second profiled surface, the air exiting the air outlet opening and subsequently fed to the air outlet gap emerges through the air outlet gap at least partially parallel or completely parallel to the second profiled surface. This forms an air film on the second profiled surface which flows over the second profiled surface in the direction of the aerofoil transition point. The air outlet gap is therefore provided and designed, in particular, for an air discharge parallel to the second profiled surface and for the formation of an air film on the second profiled surface.

At the latest at the aerofoil transition point, the air film tears away from the second profile surface or from the entire aircraft in order to subsequently continue to flow in the form of a free jet air flow, namely in the direction of the ground. This free jet air flow induces a vortex. On the inside of the wing, the suction of air through the air inlet opening supports the formation of the supporting vortex by sucking the air into the air inlet opening in the form of a suction air stream. Viewed in section, the free jet air flow now flows on one side from the supporting vortex in a free jet direction and on the other side of the supporting vortex the suction air flow in a suction direction, wherein the free jet direction and the suction direction each are tangential to the support vortex and point in different directions, in particular are opposite to each other. The support vortex is thus formed at least by the free jet air flow. In addition, the intake air flow can (optionally) contribute to the formation of the vortex. The support vortex is preferably located at least in part under the first profile surface, that is to say in particular between the first profile surface and the ground.

The air film is torn off from the second profiled surface, viewed in section, at a tear-off point. This can correspond to the aerofoil transition point or be spaced from it. On average, based on a distance between the inside of the wing or the air outlet gap from the aerofoil transition point along the second profiled surface, the distance between the inside of the wing or the air outlet gap on the one hand and the tear-off point on the other, again along the second profiled surface, is at least 50%, at least 60%, at least 70%, at least 80% or at least 90%. The air film particularly preferably flows up to the aerofoil transition point along the second profiled surface.

The lift acting on the aircraft is achieved through different mechanisms of action. On the one hand, due to the air being discharged from the air outlet gap, the air film is present on the upper side of the wing, which due to its high flow velocity, according to Bernoulli's equation, causes a negative pressure compared to the underside of the wing. Since the flow speed of the air on the side of the second profiled surface is greater than the flow speed of the air on the side of the first profiled surface, the pressure on the side of the second profiled surface is lesser than the pressure on the side of the first profiled surface. The pressure difference between the pressures on the part of the first profiled surface and on the part of the second profiled surface, i.e. the pressure difference between the underside and the top of the wing, already causes part of the lift acting on the aircraft. Another part of the lift is provided by the support vortex as soon as it is present. It is evident that the support vortex can only be formed when there is a sufficient distance between the aircraft and the ground. In order to use the lift generated by the support vortex, it is therefore first necessary to distance the aircraft from the ground. This is preferably done with the aid of a mechanical lifting device which lifts the aircraft relative to the ground.

The use of the support vortex to at least partially provide the lift enables the aircraft to be operated in a particularly energy-efficient manner, because the creation and maintenance of the support vortex is possible with a comparatively low amount of energy that is significantly less than the amount of energy that would be required to immediately lift the aircraft. The support vortex also results in a particularly high stability of the aircraft in the air because the support vortex takes up a large volume of air or creates a voluminous air cushion for the aircraft. The wing and, to this extent, the aircraft, can be scaled as required with regard to the load-bearing capacity, because the support vortex can also be scaled as required. The support vortex is designed in the manner of a potential vortex.

The wing is preferably symmetrical in section, for example even rotationally symmetrical. Basically, a distinction can be made between two different configurations of the wing. According to a first embodiment, the wing is straight and here, viewed in section, is configured symmetrically with respect to an axis of symmetry. The axis of symmetry is also referred to as the longitudinal center axis in the context of this description. In section, the axis of symmetry preferably runs centrally through the air inlet opening and the air outlet opening. The first profiled surface and the second profiled surface therefore extend from the aerofoil transition point in the direction of the axis of symmetry to the inside of the wing, which preferably delimits the air inlet opening and/or the air outlet opening. On the opposite side of the axis of symmetry, the first profile surface and the second profile surface extend in turn from a (further) wing inner side to a (further) aerofoil transition point, at which they in turn converge. To this extent, the aerofoil transition points run at a distance from one another, in particular parallel to one another. They are preferably each straight. When viewed in section, the aircraft is symmetrical with respect to the air inlet opening and/or the air outlet opening or with respect to the axis of symmetry running centrally through the air inlet opening and/or the air outlet opening. In such a configuration, the support vortex is cylindrical.

However, a second embodiment of the aircraft is preferred, according to which the wing is round or oval, so that the aircraft is designed, for example, in the manner of a flying disc. The round wing is preferably rotationally symmetrical with respect to the longitudinal center axis, wherein the longitudinal center axis represents a mirror axis of the wing when viewed in section. The aerofoil transition point is preferably formed continuously in the circumferential direction with respect to the longitudinal center axis. The aerofoil transition point preferably has a continuously constant curvature in the circumferential direction, so that the aerofoil transition point ultimately runs circularly. In this respect, the wing is annular with respect to the longitudinal center axis. In the case of the second embodiment of the aircraft, the support vortex is toroidal, wherein the torus is understood as the body of revolution of a circle, in particular as a body of rotation about the longitudinal center axis of the wing. Such a design of the support vortex that is closed in the circumferential direction enables particularly energy-efficient flight operation of the aircraft.

The air outlet opening and—preferably—the wing are at least in part overlapped by the deflecting element, in particular viewed in section. The deflecting element extends, for example, in the radial direction with respect to the longitudinal center axis of the wing in the radial direction outward, namely in particular starting from the direction of the longitudinal center axis. In a first variant of the deflecting element, the deflecting element overlaps the wing in the radial direction over at least 5%, at least 10%, at least 15% or at least 20% and in this respect only partially and less than 50%. In a second variant, it overlaps the wing over at least 50%, at least 60%, at least 70%, at least 80% or at least 90% and thus only partially, but mostly. In a third variant, which enables a particularly efficient provision of the air causing the lift, the deflecting element completely overlaps the wing in the radial direction starting from the longitudinal center axis, in particular it protrudes beyond the wing in the radial direction. For example, the deflecting element is designed in such a way that the air outlet gap is delimited by the aerofoil transition point or the tear-off point. The air outlet gap, for example, encompasses the wing on the outside as viewed in section and is present as an annular gap between the deflecting element and the wing. In this case, the air outlet gap lies, in particular, completely in an imaginary plane that is perpendicular to the longitudinal center axis. In this respect, the air exits through the air outlet gap in the vertical direction in the direction of the ground.

A further development of the invention provides that the at least one air inlet opening is arranged centrally in the first profiled surface and/or the at least one air outlet opening is arranged centrally in the second profiled surface. In other words, the air inlet opening or the air outlet opening are formed centrally in the respective profiled surface in section, in particular in longitudinal section with respect to the longitudinal center axis. This means that the air flowing out of the air outlet opening during flight operation of the aircraft flows over a large part of the second profiled surface or even the entire profiled surface, in particular in the form of the air film. For example, the air flows over, on average, at least 50%, at least 60%, at least 70%, at least 80% or at least 90% of the second profiled area. Because the air film absorbs or entrains ambient air as it flows over the second profiled surface, in particular due to the suction effect that is present due to its higher flow velocity than the ambient air, the mass flow of the air film increases as it flows over the second profiled surface. This means that the free jet air flow, which ultimately generates the support vortex, has at least temporarily a larger mass flow than the air film immediately upon its exit from the air outlet opening or the air outlet gap. This further improves the energy efficiency of the aircraft.

A further development of the invention provides that the wing is ring-shaped with respect to a longitudinal center axis and the profiled surfaces are spaced apart from one another in areas in the axial direction, as seen in the longitudinal section. This applies in particular to the above-mentioned second embodiment of the aircraft. According to this, the wing is annular and preferably rotationally symmetrical with respect to the longitudinal center axis. Seen in the longitudinal section with respect to the longitudinal center axis, the profiled surfaces are partially spaced from one another in the axial direction, namely away from the aerofoil transition point at which they converge. With this configuration of the aircraft, the aforementioned particularly energy-efficient flight operation is made possible.

A further development of the invention provides that the at least one air inlet opening and the at least one air outlet opening are flow-connected via a flow channel formed centrally in section in the wing, wherein a ducted propeller of the air delivery apparatus is arranged in the flow channel so as to be rotatable about an axis of rotation. The section is in turn preferably to be understood as the longitudinal section with respect to the longitudinal center axis of the wing. The flow channel connecting the air inlet opening and the air outlet opening to one another in terms of flow preferably has a constant flow cross-section or a constant flow cross-sectional area throughout. Ultimately, this means that the air inlet opening and the air outlet opening have the same flow cross-sectional area.

The air inlet opening is delimited continuously in the circumferential direction with respect to the longitudinal center axis by the first profiled surface, so that the first profiled surface forms an edge of the air inlet opening on the inside of the wing. Analogously to this, the second profiled surface encompasses the air outlet opening continuously in the circumferential direction, so that the second profiled surface forms an edge of the air outlet opening on the inside of the wing. The edge of the air inlet opening preferably lies continuously in an imaginary first plane, whereas the edge of the air outlet opening preferably lies continuously in an imaginary second plane. The two imaginary planes are in particular arranged parallel to one another and are preferably each perpendicular to the longitudinal center axis. Correspondingly, a normal direction of the air inlet opening and a normal direction of the air outlet opening are arranged parallel to the longitudinal center axis or coincide with it.

The ducted propeller of the air delivery apparatus is arranged and rotatably mounted in the flow channel. The ducted propeller is provided and designed to suck the air through the air inlet opening during flight operation of the aircraft and convey it in the direction of the air outlet opening so that the air sucked through the air inlet opening subsequently exits the air outlet opening. The ducted propeller represents an impeller of the air delivery apparatus, which is designed as an axial impeller. In addition to the ducted propeller, the air delivery apparatus can have a guide wheel which is arranged downstream of the ducted propeller and serves to align the air flowing through it parallel to the longitudinal center axis. The ducted propeller is arranged overall in such a way that, on the one hand, it works extremely efficiently because flow losses at the blade tips of the ducted propeller are reduced and, on the other hand, it is reliably protected from damage.

A further development of the invention provides that the air outlet opening is flow-connected to the air outlet gap via a connecting channel which, viewed in section, is present between the second profiled surface and the deflecting element. The connecting channel is delimited in section, in particular in longitudinal section with respect to the longitudinal center axis, on the one hand by the second profiled surface and on the other hand by the deflecting element, that is to say on opposite sides. The connecting channel is preferably angled with respect to the above-mentioned flow channel, so that a main flow direction of the air flowing through the connecting channel is angled with respect to a main flow direction of the air flowing through the flow channel, that is, encloses an angle that is greater than 0° and less than 180°. The angle is preferably at least 45° and at most 135°, at least 60° and at most 120°, at least 70° and at most 110°, at least 80° and at most 100° or approximately or exactly 90°.

The connecting channel, like the air outlet gap, is preferably formed continuously and in particular without interruptions in the circumferential direction with respect to the longitudinal center axis, so that the air film on the second profiled surface is also formed continuously and without interruptions. As a result, the support vortex is generated particularly efficiently. Of course, however, there can be thin webs by means of which the deflecting element is connected to the wing. From a fluidic point of view, these webs are designed in such a way that the uninterrupted connecting channel and the uninterrupted air outlet gap can nevertheless be assumed.

A further development of the invention provides that the connecting channel has a cross-section that increases or decreases in the direction of the air outlet gap, so that it is designed in the manner of a nozzle. Depending on the flow speed of the air in the flow channel, the connecting channel can either widen or taper in the direction of the air outlet gap. The shape of the connecting channel is selected in particular in such a way that the air in the air outlet gap or the air film has a desired flow speed immediately after it has emerged through the air outlet gap. This flow velocity is preferably in the subsonic range, so that no negative mechanical influences on the aircraft due to flow impacts or the like are to be expected. The design of the connecting channel in the manner of a nozzle enables the aircraft to be operated effectively.

A further development of the invention provides that the air outlet gap is designed to be continuous, in particular in the circumferential direction with respect to the longitudinal center axis. This has already been pointed out above. Such a configuration enables a uniform generation of the air film and accordingly a particularly efficient excitation of the support vortex.

A further development of the invention provides that the second profiled surface has a first region starting from the aerofoil transition point and a second region adjoining the first region and delimiting the air outlet gap, wherein the first region is curved, in particular continuous, and—seen in section—the second region is curved or flat. The second profiled surface thus has the first region and the second region in particular is composed exclusively of the first region and the second region. The first region and the second region are preferably each configured in an annular manner, wherein the first region encompasses the second region in the circumferential direction with respect to the longitudinal center axis. The first region directly adjoins the second region, in particular the first region merges seamlessly and continuously into the second region.

In section, in particular in longitudinal section with respect to the longitudinal center axis, the first region of the second profiled surface is curved, namely in the radial direction with respect to the longitudinal center axis outward away from the deflecting element. This means that the distance in the axial direction between the second profiled surface and the deflecting element in the first region also increases with increasing distance in the radial direction. The first region is particularly preferably continuously curved, that is to say has a continuous curvature different from zero, viewed in section or longitudinal section.

The second region can also be curved, for example partially or continuously. However, it can also be completely flat or—alternatively—be partially curved and partially flat. For example, when viewed in section, the second region is in overlap with the deflecting element. On the other hand, the first region is present in the radial direction away from or outside the deflecting element. The division of the second profiled surface into the first region and the second region enables a particularly advantageous air flow, so that the air film sweeping over the second profiled surface generates the support vortex in a particularly effective manner after it is torn from the wing.

A further development of the invention provides that the first profiled surface, viewed in section, is set back in part in relation to the aerofoil transition point in the direction of the second profile surface, so that a vortex chamber is formed around which is encompassed by the aerofoil transition point. The section is in turn preferably to be understood as the longitudinal section with respect to the longitudinal center axis. The setting back of the first profile surface in part with respect to the aerofoil transition point is implemented, for example, by a curvature of the first profiled surface and/or a recess, that is to say in particular the formation of a step. In the case of curvature, a radius of curvature of the curvature is preferably selected such that it is greater than a radius of the support vortex generated or corresponds approximately or exactly to this.

The vortex chamber is bounded in the axial direction upward by the first profiled surface and in the radial direction outward from the aerofoil transition point. In the radial inward direction, the vortex chamber preferably extends as far as the air inlet opening. The vortex chamber serves to receive the support vortex in certain areas during flight operation of the aircraft and stabilizes and positions the support vortex, in particular in the radial direction. Due to the positioning of the support vortex with the aid of the vortex chamber, a particularly effective generation of lift is achieved.

A further development of the invention provides that the first profiled surface and the second profiled surface are curved in the same direction, at least in part, when viewed in section. The curvature in the same direction is to be understood as a curvature with the same sign. In this way, a particularly material- and weight-saving design of the aircraft is achieved. For example, it is provided that the first profiled surface has a continuously constant curvature starting from the aerofoil transition point up to the wing inner side or up to the air inlet opening. Additionally or alternatively, the first profiled surface has a changing, in particular a decreasing, curvature starting from the aerofoil transition point in the direction of the wing inner side.

For example, the curvature of the first profiled surface directly at the aerofoil transition point is greater than the curvature of the second profiled surface. In the direction of the inside of the wing, however, the curvature of the first profiled surface decreases, for example down to a curvature of 0. Particularly preferably, the first profiled surface, viewed in section or longitudinal section, has a straight course at a distance from the aerofoil transition point, wherein an imaginary plane receives this straight course of the first profiled surface preferably being perpendicular to the longitudinal center axis. In the region of the straight course, the first profile surface particularly preferably delimits the air outlet gap. In this way, a particularly effective air flow is achieved.

A further development of the invention provides that the second profiled surface at the aerofoil transition point merges into the first profiled surface at an angle which is at least 0° and at most 60° with respect to an imaginary straight line that is perpendicular to an imaginary plane continuously receiving the aerofoil transition point. This is particularly true in section, preferably seen in longitudinal section with respect to the longitudinal center axis. The imaginary plane should consistently accommodate the aerofoil transition point. In addition, it is particularly preferably perpendicular to the longitudinal center axis. The straight line is in turn perpendicular to the imaginary plane and is in this respect preferably arranged parallel to the longitudinal center axis of the wing.

Immediately at the aerofoil transition point, the second profiled surface forms an angle of at least 0° and at most 60° with the straight line. It can therefore be provided that the second profile surface merges into the second profiled surface parallel to the straight line. However, the angle is preferably greater than 0°. For example, it is at least 15° and at most 60°, at least 30° and at most 50° or approximately or precisely 0°, approximately or precisely 30° or approximately or precisely 50°. In the aforementioned angular range, premature detachment of the air film from the second profiled surface is reliably prevented, so that the resulting free jet air flow forms the support vortex particularly effectively.

A further development of the invention provides that the deflecting element can be displaced for global and/or local change in a flow cross-sectional area of the air outlet gap. The deflecting element can be displaced in such a way, in particular by means of a control drive, that the size of the air outlet gap is changed, namely either globally and/or locally. The global change in the air outlet gap or the flow cross-sectional area of the air outlet gap is understood to mean that the size of the air outlet gap or the flow cross-sectional area is changed uniformly over the entire extent of the air outlet gap, i.e. is increased or decreased. The local change, on the other hand, means an enlargement or reduction of the air outlet gap or the flow cross-sectional area only in certain regions. For example, for the local change, the deflecting element is displaced in such a way that the air outlet gap is enlarged in some regions and reduced in some regions. By changing the flow cross-sectional area of the air outlet gap, the aircraft, in particular a flight direction of the aircraft, can be controlled in a simple manner.

A further development of the invention provides that the distance between the deflecting element and the second profile surface can be changed uniformly in order to change the flow cross-sectional area of the air outlet gap globally. Uniform change is to be understood to mean a uniform enlargement or uniform reduction of the air outlet gap. For example, for this purpose the deflecting element is displaced parallel to the longitudinal center axis of the wing, namely away from the second profiled surface in order to enlarge the air outlet surface and toward the second profiled surface in order to reduce the flow cross-sectional surface. This enables a particularly effective control of the aircraft by adjusting the vortex intensity of the support vortex.

A further development of the invention provides that the deflecting element can be tilted with respect to the second profile surface in order to locally change the flow cross-sectional area of the air outlet gap. By tilting the deflecting element, the air outlet gap is changed locally, in particular partially enlarged and partially reduced. The tilting takes place, for example, with respect to the longitudinal center axis of the wing. The deflecting element is preferably designed such that with a parallel alignment of the deflecting element with respect to the longitudinal center axis and in this respect an angle of 0°, the air outlet gap in the circumferential direction with respect to the longitudinal center axis has a constant size throughout. In contrast, when the angle changes, the local change in the flow cross-sectional area occurs. Again, such a configuration enables particularly efficient control of the aircraft.

A further development of the invention provides that first control elements and/or second control elements, which each have a control fin, extend from the first profiled surface and/or from the second profiled surface. The first control elements and the second control elements are used to control the aircraft, namely by influencing the air film and/or the vortex. It can be provided that only the first control elements, but not the second control elements, or only the second control elements but not the first control elements are present. However, it can also be provided that both the first control elements and the second control elements are implemented. Each of the control elements has a control fin, which is designed, for example, like a plate or a wing. In the latter case, the control fin can be symmetrical with respect to its profile chord or have a fluidic profile. The first control elements, which originate from the first profiled surface, serve to directly influence the support vortex, whereas the second control elements, which originate from the second profiled surface, directly influence the air film and therefore only indirectly influence the vortex. Depending on an angle of attack of the control elements, the support vortex and/or the air film are deflected, so that control of the aircraft is implemented in an effective manner. The control elements can be implemented in addition or as an alternative to the displaceability of the deflection element. The second control elements are arranged, for example, in the second region of the second profile surface or are supported in this.

A further development of the invention provides that the first control elements and/or the second control elements are drive-coupled to a control drive of the aircraft via a common coupling element. The control drive is used to adjust the control elements. It is only indirectly connected in terms of drive technology to the control elements via the common coupling element. For this purpose, on the one hand the control elements and on the other hand the control drive act on the coupling element. In particular, the control drive acts on the coupling element at a distance from the control elements. This enables the control elements to be adjusted simultaneously by means of the control drive. The deflecting element can also be connected to the coupling element in addition or as an alternative.

A further development of the invention provides that the coupling element is coupled to the first control elements and/or the second control elements and/or the control drive in each case via a ball joint and a lever arm. Each control element and/or the control drive is assigned a ball element and a lever arm by means of which they are connected to the control drive in terms of drive technology. The use of the ball joint ensures extremely flexible adjustment of the control elements by means of the control drive.

A further development of the invention provides that the coupling element is designed as a control ring. The control ring preferably encompasses the longitudinal center axis of the wing continuously and completely in the circumferential direction. It grabs both the first control elements and the second control elements—if any—in order to couple them to the control drive. The control ring is arranged in such a way that it can not only describe a rotary movement in the circumferential direction with respect to the longitudinal center axis, but that it can also be tilted and is thus in the form of a swash plate. This enables the aforementioned flexible actuation of the control elements by means of the control drive.

A further development of the invention provides that the control drive has a plurality of actuating drives which are each coupled to the coupling element in terms of drive technology at a distance from one another. The actuators are preferably evenly spaced from one another, so that in the case of two actuators they engage the coupling element at a distance of 180°, in the case of three actuators with a spacing of 120° and in the case of four actuators with a spacing of 90°. The use of the multiple actuators enables the coupling element to be displaced not only in the circumferential direction with respect to the longitudinal center axis, but also in the radial direction, so that the flexible adjustment of the control elements already described is implemented.

The invention also relates to a method for operating an aircraft, in particular an aircraft according to the statements made in the context of this description. It is provided that the aircraft has a wing which, viewed in section, is delimited on the one hand by a lower first profiled surface when the aircraft is operated as intended and on the other hand by an upper second profiled surface which merges at an aerofoil transition point with the first profiled surface, wherein the first profiled surface surrounds at least one air inlet opening and the second profile surface surrounds at least one air outlet opening and the aircraft has a drive apparatus with an air delivery apparatus which is operated for sucking air through the at least one air inlet opening and for discharging the intake air through the at least one air outlet opening, wherein the at least one air outlet opening being operated is at least in part overlapped by a deflecting element which, with the second profiled surface, delimits an air outlet gap which is flow-connected to the air outlet opening, so that the air is expelled parallel to the second profiled surface.

The advantages of such a configuration of the aircraft or such a procedure have already been pointed out. Both the aircraft and the method for its operation can be developed in accordance with the statements in the context of this description, so that reference is made to them in this respect.

A further development of the invention provides that, by means of the drive apparatus, air is sucked in the form of an intake air flow in one intake direction through the air inlet opening and is discharged through the air outlet gap in an exit direction angled with respect to the intake direction in such a way that the air forms a free jet air flow in a free jet direction at the aerofoil transition point so that a support vortex is formed between the intake air flow and the free jet air flow, which is present at least in part under the first profiled surface. This has also already been discussed.

Figure 2:
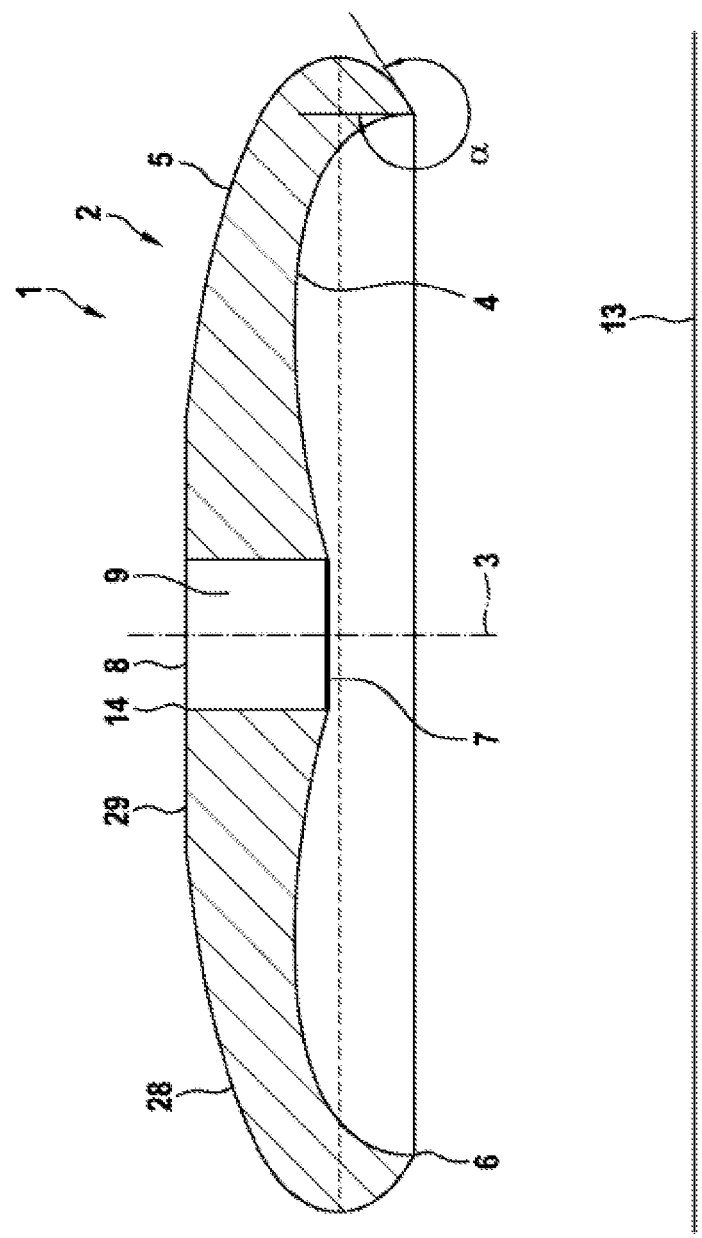

The invention is explained in more detail below with reference to the embodiments shown in the drawing, without restricting the invention. This shows:

FIG. 1 is a schematic representation of a first embodiment of an aircraft in longitudinal section with respect to a longitudinal center axis, FIG. 2 is a simplified schematic representation of the aircraft in a second embodiment, and FIG. 3 is a schematic representation of the aircraft in a third embodiment.

FIG. 1 shows a schematic representation of an aircraft 1 in a first embodiment, which has at least one wing 2 which is round or ring-shaped in cross-section with respect to a longitudinal center axis 3 of the wing 2. The support surface 2 is delimited in the axial direction with respect to the longitudinal center axis 3 in a first direction by a first profiled surface 4 and in a second direction by a second profiled surface 5. Each of the profiled surfaces 4 and 5 is itself ring-shaped. The two profiled surfaces 4 and 5 merge at an aerofoil transition point 6, wherein the transition between the profiled surfaces 4 and 5 preferably is discontinuous at this point when viewed in section. The profiled surfaces 4 and 5 therefore preferably jointly form an edge at the aerofoil transition point 6. For this purpose, the aerofoil transition point 6 is in the form of a geometric circle, into which the first profiled surface 4 opens at a first angle and the second profiled surface 5 opens at a second angle different from the first angle.

The first profiled surface 4 surrounds an air inlet opening 7 and the second profiled surface 5 an air outlet opening 8. The air inlet opening 7 and the air outlet opening 8 are flow-connected to one another via a flow channel 9, wherein a ducted propeller 10 of an air delivery apparatus 11 is rotatably mounted in the flow channel 9. The air delivery apparatus 11 is part of a drive apparatus 12 of the aircraft 1. It can be clearly seen that the first profiled surface 4 is present on a side of the aircraft 1 facing a floor 13, whereas the second profiled surface 5 faces away from the ground 13. The aircraft 1 is shown here during normal and intended flight operation.

The air inlet opening 7 and the air outlet opening 8 are located centrally with respect to the longitudinal center axis 3 and are surrounded by the first profile surface 4 and the second profile surface 5, respectively, on an inner side 14 of the wing in the radial direction. The flow channel 9, which fluidically connects the air inlet opening 7 and the air outlet opening 8, is, for example, in the form of a cylinder, in particular a circular cylinder and particularly preferably in the form of a straight circular cylinder. The air inlet opening 7 and the air outlet opening 8 particularly preferably have the same flow cross-section. The air inlet opening 7 is arranged on an underside and the air outlet opening 8 on an upper side of the aircraft 1. The air outlet opening 8 is overlapped at least in part, completely in the embodiment shown here, by a deflecting element 15 which, together with the second profiled surface 5, delimits an air outlet gap 16. The air outlet gap 16 is therefore between the deflecting element 15 and the second profiled surface 5 when viewed in longitudinal section.

The air outlet gap 16 is flow-connected to the air outlet opening 8 via a connection channel 17, wherein the connection channel 17 also is at least partially delimited by the deflecting element 15 and the second profiled surface 5. In the embodiment shown here, both the air outlet gap 16 and the connecting channel 17 are formed continuously in the circumferential direction with respect to the longitudinal center axis 3 and each completely encompass the longitudinal center axis 3. According to the illustrated embodiment, a flow cross-section of the connecting channel 17 is reduced in the direction of the air outlet gap 16, so that the connecting channel 17 is in the form of a nozzle and the air outlet gap 16 represents an orifice of this nozzle.

The deflecting element 15 can be displaced in such a way that a flow cross-sectional area of the air outlet gap 16 can be changed locally and/or globally. For this purpose, the deflecting element 15 is coupled in terms of drive technology, for example, to a control drive, not shown here, of the aircraft 1. Additionally or alternatively, several first control elements 18 are connected to the control drive in terms of drive technology. In addition or as an alternative to the first control elements 18, second control elements (not shown here) can be present. The first control elements 18 are based on the first profiled surface 4; the second control elements from the second profiled surface 5. The control elements 18 each have a control fin 19 and are each drive-connected via a lever arm, not shown here, and a ball joint, also not shown, with a coupling element 20, which is present, for example, as a control ring. The coupling element 20 is used for the drive connection of the control elements 18 to the control drive, in particular to several actuating drives of the control drive, which are not shown here.

During flight operation of the aircraft 1, the drive device 12 is operated in such a way that air is conveyed from the underside of the aircraft 1 in the direction of its upper side or in such a way that air is sucked in the form of an intake air stream 21 in an intake direction through the air inlet opening 7 and is delivered through the flow channel 9 in the direction of the air outlet opening 8. The delivered air is discharged through the air outlet opening 8 and fed through the connecting channel 17 to the air outlet gap 16. The air is discharged through the air outlet gap 16 in an outlet direction in the form of an air film 22 in such a way that the air film 22 rests against the second profile surface 5. For this purpose, the air film 22 is preferably applied to the air outlet gap 16 parallel to the second profiled surface 5.

Due to the Coanda effect, the air film 22 runs along the second profiled surface 5 up to the aerofoil transition point 6. There the air film 22 detaches from the wing 2 and flows as a free jet air stream 23 in turn onto the underside of the aircraft 1, namely in a free jet direction. Here, the free jet air flow 23 stimulates a support vortex 24 which provides at least part of the lift for the aircraft 1. The support vortex 24 is reinforced by the intake air flow 21. It can be seen that both the free jet air flow 23 and the intake air flow 21 are each tangential to the support vortex 24. Due to the annular shape of the wing 2, the support vortex 24 formed has a toroidal shape. For the sake of clarity, the support vortex 24 is shown only on one side of the wing 2. Of course, however, the support vortex 24 preferably completely and continuously surrounds the longitudinal center axis 3 in the circumferential direction. Due to the high speed of the air film 22, it causes a suction effect on the surrounding air. This means that further air is supplied to the air film 22 as it flows over the second profiled surface 5. This is indicated by the arrows 25.

In order to achieve precise positioning of the support vortex 24 below the wing 2, a vortex chamber 26 is formed on the wing 2, which is delimited in the radial direction outward by the aerofoil transition point 6. The vortex chamber 26 is formed, for example, by a curvature or a recess of the first profiled surface 4. In order to achieve a particularly advantageous flow around the second profile surface 5 through the air film 22, the second profiled surface 5 merges at the aerofoil transition point 6 at an angle $\alpha$ into the first profile surface 4, which is determined with respect to a straight line 27 which parallel to the longitudinal center axis 3 runs through the aerofoil transition point 6. The straight line 27 is in particular perpendicular to an imaginary straight line which continuously receives the aerofoil transition point 6.

It should be pointed out that the configuration of the wing 2 described here as an annular wing 2 merely represents an advantageous embodiment. The wing 2 can also be basically straight and in this case have, for example, the cross-section shown. The advantages described can in principle also be achieved with such a configuration.

FIG. 2 shows schematically and in a simplified manner a second embodiment of the aircraft 1, wherein some elements are being shown for reasons of clarity. In principle, the second embodiment corresponds to the first embodiment, so that reference is made to the corresponding statements and only the differences are discussed below. On the one hand, these are due to the fact that the angle $\alpha$ is negative or greater than 180°. For example, the angle $\alpha$ is at least 270° and is less than 360°. Alternatively, it is at least 300° and at most 345° or at most 330°. This means that the second profiled surface 5 approaches the longitudinal center axis 3 again, starting from an outer side of the wing, on which it is at the greatest distance from the longitudinal center axis 3, before it merges into the first profiled surface 4 at the aerofoil transition point 6.

Another difference is that the air inlet opening 7 is clearly spaced in the axial direction with respect to the longitudinal center axis 3 from an imaginary plane which continuously accommodates the aerofoil transition point 6. For example, the distance is at least 20%, at least 30%, at least 40% or at least 50% of an axial distance between the plane and a point of the second profiled surface 5 or the air outlet opening that is furthest from the plane when viewed in the axial direction. As a result, the air inlet opening 7 is arranged away from the plane by the corresponding distance, so that the formation of the support vortex is facilitated.

Another difference can be seen in the fact that the second profile surface 5 is not continuously curved, but rather is composed of a first region 28 and a second region 29. The first region 28, seen in section, extends starting from the aerofoil transition point 6 to directly to the second region 29. It is preferably continuously curved when viewed in section. The second region 29, however, is planar when viewed in section or has a different curvature from the first region 28. For example, the transition between the first region 28 and the second region 29 is discontinuous when viewed in section. Alternatively, however, it can also be designed continuously.

It should be noted that each of the differences mentioned is applicable to the first embodiment. It is therefore not necessary that the differences always occur in combination with one another.

FIG. 3 shows a schematic representation of the fluid body 1 in a third embodiment. Basically, reference is again made to the above statements and only the difference from the first embodiment and the second embodiment is discussed below.

The difference lies essentially in the fact that the deflecting element 15 completely overlaps the wing 2 when viewed in section, so that, starting from the longitudinal center axis 3 of the wing 2, it extends in the radial direction to beyond the outer side of the wing. The air inlet opening 7 and the air outlet opening 8 are preferably located in imaginary planes which are spaced apart parallel to one another and are perpendicular to the longitudinal center axis 3 and bear against the wing 2 from opposite sides. The plane in which the air inlet opening 7 is present is arranged on an underside and the plane in which the air outlet opening 8 is present on an upper side of the wing 2.

The air outlet gap 16 is in the form of an annular gap and is completely accommodated in an imaginary plane that is perpendicular to the longitudinal center axis 3. This imaginary plane is preferably located between the planes of the air inlet opening 7 and the air outlet opening 8, in particular closer to the former. However, it can also be present on the side of the air inlet opening facing away from the air outlet opening 8. The embodiment described enables particularly effective guidance of the air from the outlet opening 8 to the air outlet gap 16, in particular without utilizing the Coanda effect. The connecting channel 17, which fluidically connects the air outlet opening 8 and the air outlet gap 16, has, viewed in section, a flow cross-section that is continuously decreasing at least in sections, in particular continuously, wherein the flow cross-section in the air outlet gap 16 is smaller than at the air outlet opening 8. It can be provided, purely optionally, that the deflecting element 15 has a plurality of air guide webs. The air guide webs start from a base body of the deflecting element 15 and protrude into the connecting channel 17. The air guide webs extend in the radial direction and are preferably evenly distributed in the circumferential direction with respect to the longitudinal center axis 3. The air guide webs serve to guide the air entering the connecting channel 17 from the air outlet opening 8. They reduce a swirl in the air which it possibly has due to the air delivery apparatus 11, not shown here. In addition, in the embodiment shown here, the air delivery apparatus 11 is preferably fastened to the deflecting element 15 and, in particular, is only fastened to the supporting surface 2 via this.

The control of the aircraft 1 also takes place in the third embodiment preferably with the first control elements 18 and/or the second control elements, not shown here. The first control elements 18 and the second control elements can be configured in accordance with the above explanations. In the case of the second control elements, a mounting can be implemented particularly preferably on both the wing 2 and on the deflecting element 15. The second control elements are therefore rotatably mounted on the one hand on the wing 2 and on the other hand on the deflecting element 15. Alternatively, however, a mounting can also only take place on the wing 2 or the deflecting element 15, so that the control element or a shaft used for bearing the control element is spaced apart from the deflecting element 15 or the wing 2.

It can also be provided, purely optionally, that, in comparison to the first embodiment, the first control elements 18 and/or the second control elements are omitted. The aircraft 1 is controlled, for example, by displacing and/or deforming control elements which form part of the wing 2 and start from a base body of the wing 2. The control elements are arranged and/or articulated to the base body on a side of the base body lying on the outside in the radial direction. By displacing and/or rotating the control elements with respect to the base body, the air exiting through the air outlet gap 16 can be deflected and thus the aircraft 1 can be controlled.

The control elements can preferably be displaced and/or rotated independently of one another. However, they can also be coupled to one another so that the displacement and/or rotation takes place, for example, by means of a common actuator.

It should be pointed out that the explanations relating to the third embodiment can also be used for the first embodiment and the second embodiment. It can therefore also be provided, for example, that according to the difference described, the deflecting element 15 completely overlaps the wing 2, but instead of the control elements, the optional control elements of the third embodiment are present. The deflecting elements can of course also be present, but the deflecting element 15 only partially overlaps the wing 2. To this extent, the deflecting elements can also be used in the context of the first embodiment or the second embodiment.

The aircraft 1 described has the advantage in all embodiments that it works extremely energy-efficiently due to the use of the support vortex 24 to provide at least part of the lift. In addition, the aircraft 1 can be controlled extremely precisely by means of the displaceable deflecting element 15 and/or the control elements 18. In particular, the aircraft 1 can hover in the air analogously to a helicopter. Nevertheless, it can achieve very high speeds because, in contrast to the helicopter, it is not limited by a maximum flow speed at the blade tips of a rotor.

The invention claimed is:

1. An aircraft, comprising a wing which, viewed in section, is delimited on one side by a lower first profiled surface, that is on the side of the aircraft facing the ground when the aircraft is operated as intended, and on the other side is delimited by an upper second profiled surface, which merges at an aerofoil transition point with the first profiled surface, wherein the first profiled surface encloses at least one air inlet opening and the second profiled surface has at least one air outlet opening and the aircraft has a drive apparatus with an air delivery apparatus which is provided and designed for sucking air through the at least one air inlet opening and for discharging the sucked air through the at least one air outlet opening, wherein the at least one air outlet opening is overlapped at least in part by a deflecting element which, together with the second profiled surface delimits an air outlet gap which is flow-connected to the air outlet opening, wherein conveying the air through the at least one air inlet opening by the drive apparatus occurs from the underside of the aircraft, and wherein during flight operation of the aircraft the drive apparatus is operated in such a way, that air in the form of an air intake stream is conveyed from the underside of the aircraft in the direction of its upper side and an air film that runs along the second profiled surface detaches from the wing at a tear-off point and flows as a free jet air stream onto the underside of the aircraft, such that a toroidal support vortex is stimulated in the manner of a potential vortex which is located at least in part between the first profile surface and the ground and to which both the free jet air flow and the intake air flow are tangential.

2. The aircraft according to claim 1, characterized in that the at least one air inlet opening is arranged centrally in the first profiled surface or the at least one air outlet opening is arranged centrally in the second profiled surface.

3. The aircraft according to claim 1, characterized in that the wing is ring-shaped with respect to a central longitudinal axis and the profiled surfaces are spaced apart from one another in the axial direction at least in part.

4. The aircraft according to claim 1, characterized in that the at least one air inlet opening and the at least one air outlet opening are flow-connected via a flow channel formed centrally in section in the wing, wherein in the flow channel a ducted propeller of the air delivery apparatus is arranged to be rotatable about an axis of rotation.

5. The aircraft according to claim 1, characterized in that the air outlet opening is flow-connected to the air outlet gap via a connecting channel which, viewed in section, is between the second profiled surface and the deflecting element.

6. The aircraft according to claim 1, characterized in that the connecting channel has a cross-section that increases or decreases in the direction of the air outlet gap, so that it is designed in the manner of a nozzle.

7. The aircraft according to claim 1, characterized in that the second profiled surface has a first region starting from the aerofoil transition point and a second region adjoining the first region and delimiting the air outlet gap, wherein—viewed in section—the first region is curved and the second region is curved or flat.

8. The aircraft according to claim 1, characterized in that the first profiled surface, viewed in section, is set back in some regions with respect to the wing transition point in the direction of the second profiled surface, so that a vortex chamber is formed which is encompassed by the aerofoil transition point.

9. The aircraft according to claim 1, characterized in that the first profiled surface and the second profiled surface in section are at least partially curved in the same direction.

10. The aircraft according to claim 1, characterized in that the second profiled surface at the aerofoil transition point merges into the first profiled surface at an angle which with respect to a straight line perpendicular to an imaginary plane continuously receiving the aerofoil transition point is at least 0° and at most 60°.

11. The aircraft according to claim 1, characterized in that the deflecting element can be displaced for the global and/or local change in a flow cross-sectional area of the air outlet gap.

12. The aircraft according to claim 1, characterized in that first control elements and/or second control elements, each having a control fin, extend from the first profiled surface and/or from the second profiled surface.

13. The aircraft according to claim 1, characterized in that the first control elements and/or the second control elements are drive-coupled to a control drive of the aircraft via a common coupling element.

14. A method for operating the aircraft of claim 1, wherein the aircraft comprises a wing which, viewed in section, is delimited on one side by a lower first profiled surface, that is on the side of the aircraft facing the ground when the aircraft is operated as intended, and on the other side by an upper second profiled surface which is delimited merges at an aerofoil transition point with the first profiled surface, wherein the first profiled surface surrounds at least one air inlet opening and the second profiled surface surrounds at least one air outlet opening and the aircraft comprises a drive apparatus with an air delivery apparatus, which is used to suck air through the at least one air inlet opening and to discharge the intake air through the at least one air outlet opening, wherein the at least one air outlet opening is overlapped at least in part by a deflecting element which, together with the second profiled surface, delimits an air outlet gap which is flow-connected to the air outlet opening, so that the air is discharged parallel to the second profiled surface, wherein conveying the air through the at least one air inlet opening by the drive apparatus occurs from the underside of the aircraft, and wherein during flight operation of the aircraft the drive apparatus is operated in such a way, that air in the form of an air intake stream is conveyed from the underside of the aircraft in the direction of its upper side and an air film that runs along the second profiled surface detaches from the wing at a tear-off point and flows as a free jet air stream onto the underside of the aircraft, such that a toroidal support vortex is stimulated in the manner of a potential vortex which is located at least in part between the first profile surface and the ground and to which both the free jet air flow and the intake air flow are tangential.

15. The method according to claim 14, characterized in that by means of the drive apparatus, air is sucked in in the form of an intake air stream in a suction direction through the air inlet opening and discharged through the air outlet gap in an exit direction angled with respect to the suction direction such that at the aerofoil transition point the air forms a free jet air flow in a free jet direction, so that a support vortex is formed between the intake air flow and the free jet air flow, which is at least partially under the first profiled surface.

* * * * *